(12) United States Patent
Hagleitner

(10) Patent No.: US 8,596,501 B2
(45) Date of Patent: Dec. 3, 2013

(54) REFILL UNIT HAVING A CONTAINER

(71) Applicant: Hans Georg Hagleitner, Zell am See (AT)

(72) Inventor: Hans Georg Hagleitner, Zell am See (AT)

( * ) Notice: Subject to any disclaimer, the term of this patent is extended or adjusted under 35 U.S.C. 154(b) by 0 days.

(21) Appl. No.: 13/658,012

(22) Filed: Oct. 23, 2012

(65) Prior Publication Data

US 2013/0043280 A1 Feb. 21, 2013

Related U.S. Application Data

(63) Continuation of application No. PCT/AT2011/000197, filed on Apr. 21, 2011.

(30) Foreign Application Priority Data

Apr. 23, 2010 (AT) .................................. A 666/2010

(51) Int. Cl.
*B65D 37/00* (2006.01)
(52) U.S. Cl.
USPC ........ 222/207; 222/181.1; 222/212; 222/213; 222/494; 222/633
(58) Field of Classification Search
USPC ........... 222/207, 209, 212–215, 181.1–181.3, 222/380, 630–633, 490, 494, 372, 481; 137/512, 512.2, 512.4
See application file for complete search history.

(56) References Cited

U.S. PATENT DOCUMENTS

| 2,772,817 | A | | 12/1956 | Jauch |
| 3,592,357 | A | * | 7/1971 | Welch ........................... 222/630 |
| 3,828,985 | A | * | 8/1974 | Schindler ...................... 222/207 |
| 4,168,020 | A | | 9/1979 | Benson |
| 4,646,945 | A | * | 3/1987 | Steiner et al. ................. 222/207 |
| 4,776,495 | A | | 10/1988 | Vignot |
| 4,930,667 | A | | 6/1990 | Holzner, Sr. |
| 5,082,150 | A | * | 1/1992 | Steiner et al. ............ 222/189.09 |
| 5,238,156 | A | * | 8/1993 | Andris ........................... 222/207 |
| 5,810,203 | A | * | 9/1998 | Brennan ......................... 222/207 |
| 8,360,285 | B2 | * | 1/2013 | Grbesic .......................... 222/207 |
| 2013/0043276 | A1 | * | 2/2013 | Hagleitner ................. 222/181.1 |
| 2013/0043279 | A1 | * | 2/2013 | Hagleitner ..................... 222/207 |

* cited by examiner

*Primary Examiner* — Frederick C Nicolas
(74) *Attorney, Agent, or Firm* — Laurence A. Greenberg; Werner H. Stemer; Ralph E. Locher

(57) ABSTRACT

A refilling unit for a dispenser containing a liquid or pasty media has a container which can be ventilated. A dosing pump is placed on the neck of the container. A first valve is provided in a transition from the neck to the dosing pump and a second valve on a discharge opening of the dosing pump. The dosing pump contains an elastic part having the first non-return valve. The elastic part encircles a lower peripheral collar of the neck and an annular lip thereof resting on the interior of the neck. The dosing pump further has a second elastic part containing the second non-return valve and encloses a delivery space. The second elastic part extends over the first part and encircles at least one upper peripheral collar of the neck. Recesses in the peripheral collars and at the front of the neck leave an airway into the container.

5 Claims, 2 Drawing Sheets

Fig. 1
Fig. 2
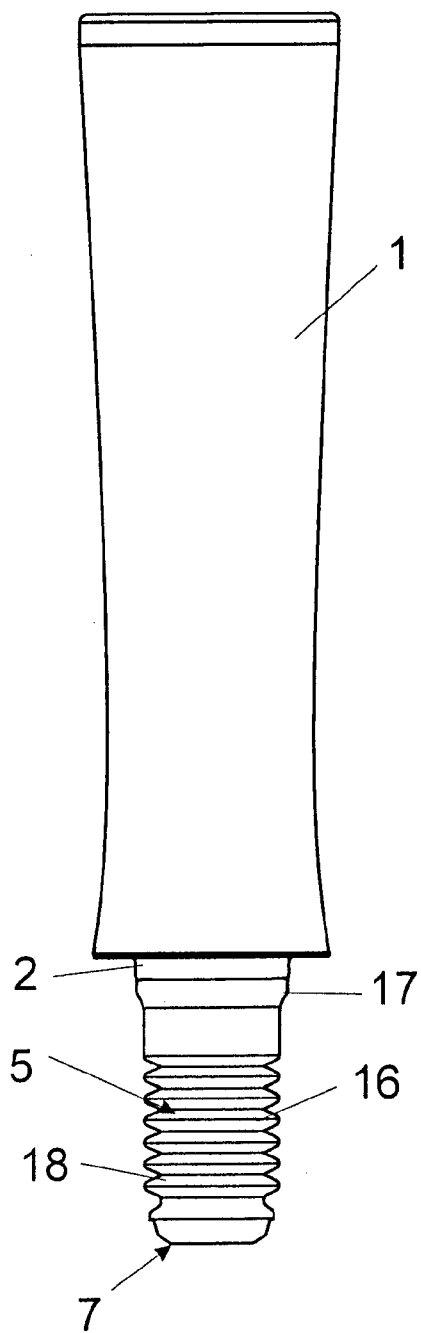
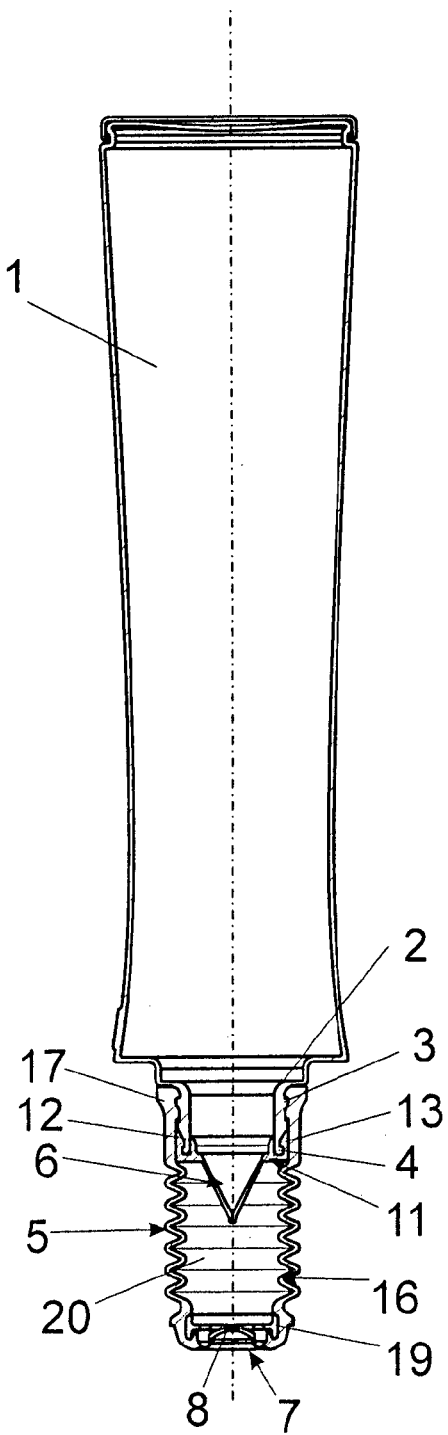

REFILL UNIT HAVING A CONTAINER

CROSS-REFERENCE TO RELATED APPLICATION

This application is a continuation, under 35 U.S.C. §120, of copending international application No. PCT/AT2011/000197, filed Apr. 21, 2011, which designated the United States; this application also claims the priority, under 35 U.S.C. §119, of Austrian patent application No. AT A666/2010, filed Apr. 23, 2010; the prior applications are herewith incorporated by reference in their entirety.

BACKGROUND OF THE INVENTION

Field of the Invention

The invention relates to a refill unit having a container for a liquid or pasty media which can have air admitted to it and has a metering pump attached to its neck, for upended arrangement in a dispenser. A first non-return valve is provided at the transition from the neck into the metering pump and a second non-return valve is provided on the dispensing opening of the metering pump.

The medium which has been introduced in such a container may be of any desired type, in particular media from the sanitary or hygiene sector, for example soap, shampoo, cream, disinfectant or the like, wherein the type of medium is merely of secondary importance.

Suitable dispensers are known in a number of embodiments, and the metering pumps, which can be actuated by hand or by motor, have a pump chamber, of which the volume can be reduced in size, wherein the two non-return valves act alternately. The pump chamber, in the rest position, is filled with the medium and—as soon as the pump is actuated—a portion is pushed out through the lower non-return valve, whereas the upper valve prevents return into the container. If the actuating element is reset, then the lower valve closes and prevents air from entering, whereas the upper valve opens and takes medium into the pump chamber. If the container is not compressible, then air has to be able to flow into the container.

U.S. Pat. No. 4,930,667 relates to the supply of air to such a container which is inserted in an upended state in a dispenser and on which is provided a metering pump in the form of a squeezable tube which can be compressed by a transversely movable slide and has a flange pushed against the threaded neck of the stiff container by a union nut. The thread turns have sufficient play to allow an air flow. The union nut, furthermore, also clamps a disk with two openings, of which one is covered by a membrane which forms the upper non-return valve, and can open in the downward direction, and the second accommodates a filter insert, through which the air flowing via the thread can pass into the container, but which is impermeable to the container contents. The metering pump with the air-admission device is in a number of parts and is therefore too expensive to produce if the container, including the neck-closing metering pump, is thrown away, rather than refilled, once it has been emptied.

SUMMARY OF THE INVENTION

It is an object of the invention, then, for a refill unit of the type mentioned in the introduction having a container, with a metering pump attached to its neck, to be produced from the smallest number of components in such a cost-effective manner that it can be disposed of with the metering pump, once it has been emptied, while losses remain at a minimal level. Furthermore, there is no need for cleaning and servicing of the pump or an additional dispenser housing, since the stiff container, which cannot be compressed by the external air pressure, may also be configured in an aesthetically pleasing manner.

This is achieved according to the invention in that the metering pump has a first part, which contains the first non-return valve, engages around at least one lower circumferential rib of the neck and has an annular lip butting against the inside of the neck, and a second part, which contains the second non-return valve, encloses a delivery chamber, extends over the first part and engages around at least one upper circumferential rib of the neck. Recesses in the circumferential ribs and on an end side of the neck leave free an air path into the container. The mouth opening of which is covered by the lip of the first part, the lip butting against the inside of the neck.

It is therefore the case that the refill unit according to the invention is made up overall of just three elements, that is to say of the container and of the two parts of the metering pump, which preferably each consist of an elastic material and are formed in one piece with the non-return valve.

The second part of the metering pump here is configured, in particular, as a folding bellows, which is raised, and compressed, by an actuating element, which is arranged in the dispenser, for the purpose of dispensing a portion of contents.

In order to arrange the container in the correct position in the dispenser, a marking or a coding element is preferably provided in the neck region. As a result, once the refill unit has been inserted into the dispenser, this allows information which may be provided on the container, for example details relating to the contents, etc., to be located on the rear side of the container, rather than in direct view of the person looking at it.

Other features which are considered as characteristic for the invention are set forth in the appended claims.

Although the invention is illustrated and described herein as embodied in a refill unit having a container, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, front view of a refill unit in a use position according to the invention;

FIG. 2 is a diagrammatic, longitudinal sectional view through the refill unit.

DETAILED DESCRIPTION OF THE INVENTION

Figure 3:
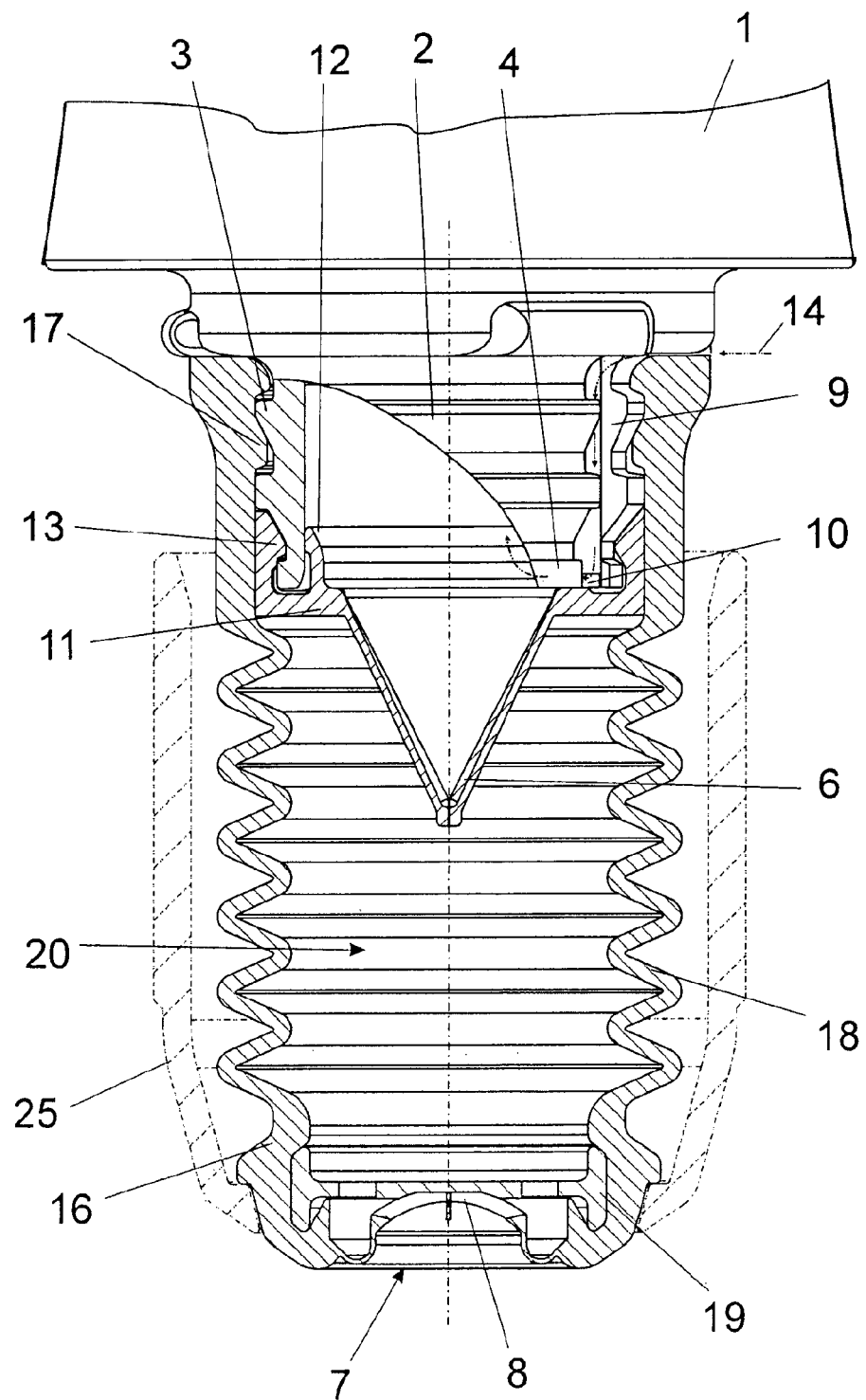
FIG. 3 is an enlarged scale, sectional view of a region of a container neck with a metering pump.

Referring now to the figures of the drawing in detail and first, particularly, to FIG. 1 thereof, there is shown a refill unit for a dispenser for dispensing a liquid or pasty medium. The refill unit contains a stiff container 1 which can have air admitted to it and has a neck 2, with at least two circumferential ribs 3, 4, and also contains a metering pump 5, which is arranged on the neck 2. The metering pump 5 is made up of two parts 11, 16 made of an elastic material, wherein a first non-return valve 6 is formed in one piece with the first part 11, the non-return valve 6 being provided at the transition from the neck 2 into a delivery chamber 20 of the metering pump 5. The first part 11 has a ring or a bead 13 engaging around at least the lowermost circumferential rib 4 and is provided with an annular sealing lip 12, which pushes against the inner surface of the neck 2.

A second, push-out non-return valve 8 is formed in one piece with the second part 16 of the metering pump 5, the second non-return valve closing the dispensing opening 7 of the metering pump 5. The central region of the second part 16, this central region enclosing the delivery chamber 20, is provided in the form of a folding bellows 18. The uppermost region of the second part 16 forms a collar, which extends upward beyond the first part 11 and has a ring or bead 17 engaging over at least one upper circumferential rib 3 on the neck 2. A reinforcing ring 19 may be inserted in the vicinity of a dispensing opening 7.

The delivery chamber 20 is reduced in size by virtue of the lower region of the second part 16, the lower region containing the second non-return valve 8, being raised, wherein the folding bellows 18 is compressed. The device which is necessary for this purpose is not part of the subject matter of the invention and is therefore indicated only in FIG. 3 by the dashed-line driver sleeve 25, which acts on the metering pump 5 around the dispensing opening 7.

If the driver sleeve 25 is raised, then medium enclosed in the delivery chamber 20—air in the event of initial actuation—is pushed out through the dispensing opening 7 via the valve 8, since the first non-return valve 6 blocks the path into the container 1.

A non-illustrated restoring device, which is assigned, in particular, to the driver sleeve 25, but can also act on the folding bellows 18, increase the size of the delivery chamber 20, wherein the second non-return valve 8 closes in an airtight manner and the first valve 6 opens, so that medium can flow into the delivery chamber 20 out of the container 1.

In order that air can flow into the container 1, which should not be compressed by external air pressure, when the medium is extracted by suction into the delivery chamber 20, an air path 14 is made in the neck 2, this air path being illustrated schematically in FIG. 3 by the chain-dotted arrows. The neck 2 has at least one groove-like recess 9, which interrupts the circumferential ribs 3, 4, extending on it from top to bottom, and merging into a recess 10 in the end surface of the neck 2.

A mouth opening of the recess 10 on the inner surface of the neck 2 is covered over by the sealing lip 12 of the first part 11 of the metering pump, the sealing lip 12 detaching itself from the inner surface of the neck as a portion of the medium is extracted by suction out of the container 1, so that the air which is required can flow into the container 1 via the air path 14.

The invention claimed is:

1. A refill unit, comprising:
   a container having a neck for storing a liquid or pasty media and having air being admitted into said container, said container being provided for upended arrangement in a dispenser, said neck having at least one lower circumferential rib, at least one upper circumferential rib and an end side with a recess defining a mouth opening formed therein, said upper and lower circumferential ribs having recesses formed therein and with said recess on said end side of said neck leave free an air path into said container;
   a metering pump attached to said neck and having a dispensing opening formed therein;
   a first non-return valve disposed at a transition from said neck into said metering pump;
   a second non-return valve disposed at said dispensing opening of said metering pump; and
   said metering pump having a first part and containing said first non-return valve, and engaging around said at least one lower circumferential rib of said neck, said first part having an annular lip butting against an inside of said neck, said metering pump having a second part containing said second non-return valve, encloses a delivery chamber, extends over said first part and engages around said at least one upper circumferential rib of said neck, said mouth opening being covered by said annular lip of said first part.

2. The refill unit according to claim 1, wherein said first part of said metering pump and said first non-return valve are formed as a one piece unit from an elastic material.

3. The refill unit according to claim 1, wherein said second part of said metering pump and said second non-return valve are formed as one piece unit from an elastic material.

4. The refill unit according to claim 1, wherein said second part of said metering pump has a folding bellows.

5. The refill unit according to claim 1, wherein said container has a coding element in a neck region.

* * * * *